(12) United States Patent
Lee et al.

(10) Patent No.: US 7,738,051 B2
(45) Date of Patent: Jun. 15, 2010

(54) PORTABLE DISPLAY DEVICE

(75) Inventors: Youn Bum Lee, Ulsan (KR); Nam Cheol Hyeong, Ulsan (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 375 days.

(21) Appl. No.: 11/520,147

(22) Filed: Sep. 12, 2006

(65) Prior Publication Data
US 2007/0109462 A1    May 17, 2007

(30) Foreign Application Priority Data
Nov. 17, 2005    (KR) .................... 10-2005-0110434

(51) Int. Cl.
G02F 1/1333    (2006.01)
(52) U.S. Cl. ........................ 349/58; 349/149
(58) Field of Classification Search .............. 349/1, 349/5, 56, 58, 60, 84, 139, 149, 150
See application file for complete search history.

(56) References Cited

U.S. PATENT DOCUMENTS

| | | | | |
|---|---|---|---|---|
| 5,182,660 A | * | 1/1993 | Tanaka ........................ | 349/65 |
| 5,774,199 A | * | 6/1998 | Ozawa ........................ | 349/149 |
| 5,835,139 A | * | 11/1998 | Yun et al. .................... | 349/58 |
| 5,853,091 A | * | 12/1998 | Luenser ....................... | 211/40 |
| 5,926,237 A | * | 7/1999 | Yun et al. ..................... | 349/58 |
| 6,056,133 A | * | 5/2000 | Luenser ....................... | 211/183 |
| 6,536,147 B1 | * | 3/2003 | Funk et al. .................... | 40/605 |
| 6,688,025 B1 | * | 2/2004 | Cullinan ...................... | 40/568 |
| 6,747,713 B1 | * | 6/2004 | Sato ........................... | 349/58 |
| 6,771,490 B2 | * | 8/2004 | Peker et al. ............. | 361/679.34 |
| 6,885,419 B2 | * | 4/2005 | Ogawa ........................ | 349/113 |
| 2003/0062811 A1 | * | 4/2003 | Peker et al. .............. | 312/223.1 |
| 2005/0286008 A1 | * | 12/2005 | Miyagawa et al. .......... | 349/158 |
| 2007/0203267 A1 | * | 8/2007 | Richard et al. ................ | 524/47 |
| 2007/0223182 A1 | * | 9/2007 | Swan et al. ................. | 361/679 |
| 2007/0236960 A1 | * | 10/2007 | Anderson et al. ........... | 362/627 |

FOREIGN PATENT DOCUMENTS

JP        60-134362        9/1985

(Continued)

OTHER PUBLICATIONS

Korean Patent Abstract for Korean Publication No. 1020050000684 A, published on Jan. 6, 2005 in the name of Woong Kwon Kim.

(Continued)

Primary Examiner—Frank G Font
Assistant Examiner—Peter Radkowski
(74) Attorney, Agent, or Firm—Christie, Parker & Hale, LLP

(57) ABSTRACT

A portable display device is provided. The portable display device includes a liquid crystal display panel for displaying an image, a back light assembly having a light source for supplying light to the liquid crystal display panel, and a bottom chassis for supporting the back light assembly. The sides of the bottom chassis have an I-beam shaped or C-beam shaped cross-section.

14 Claims, 4 Drawing Sheets

FOREIGN PATENT DOCUMENTS

| | | |
|---|---|---|
| JP | 03-273591 | 12/1991 |
| JP | 4-22319 | 3/1992 |
| JP | 2000-092415 | 3/2000 |
| JP | 2001-075096 | 3/2001 |
| JP | 2002-170521 | 6/2002 |
| JP | 2003-075809 | 3/2003 |
| JP | 2004-361958 | 12/2004 |
| JP | 2005-056828 | 3/2005 |
| KR | 10-2005-0000684 | 1/2005 |

OTHER PUBLICATIONS

English translation of Claims for Japanese application 60-134362 listed above, published Mar. 16, 1987 as JP 62-43230.

English abstract for Japanese application 4-22319 listed above, published Oct. 8, 1993 as JP 5-73998.

Japanese Office action dated Sep. 15, 2009, for corresponding Japanese application 2006-136308, noting listed references in this IDS.

* cited by examiner

PORTABLE DISPLAY DEVICE

CROSS-REFERENCE TO RELATED APPLICATIONS

This application claims priority to and the benefit of Korean Patent Application No. 10-2005-0110434, filed on Nov. 17, 2005, in the Korean Intellectual Property Office, the entire content of which is incorporated herein by reference.

BACKGROUND

1. Field of the Invention

The present invention relates to a portable display device, and more particularly to, a portable display device capable of improving the strength of a support chassis included therein.

2. Discussion of Related Art

Recently, various flat panel displays (FPDs) have been developed capable of reducing weight and volume that are disadvantages of cathode ray tubes (CRTs). The FPDs include liquid crystal displays (LCDs), field emission displays (FEDs), plasma display panels (PDPs), and organic light emitting displays (OLEDs).

Among the FPDs, the LCDs and OLEDs are small and light and have low power consumption so that the LCDs and OLEDs have been spotlighted as substitutes that can overcome the disadvantages of the conventional CRTs. Currently, the LCDs and OLEDs are mounted in monitors and TVs that are large products as well as in portable apparatuses such as mobile telephones and personal digital assistants (PDA). In particular, the portable display devices such as the LCDs and OLEDs are used for the display units of the portable apparatuses.

However, as the portable apparatuses become smaller and slimmer, the thickness of the portable display devices is reduced and protective components that are not required for driving the portable display devices tend to be eliminated.

Accordingly, as the portable display devices become slimmer and the portable display devices structurally weakened, the portable display devices are often damaged, and as a result, tend to easily become defective. Therefore, there is a need to improve the strength of the portable display devices without increasing the thickness of the portable display devices.

SUMMARY OF THE INVENTION

In accordance with the present invention a strong portable display device is provided in which the sides of a bottom chassis have an I-beam or C-beam shaped cross-section to improve the strength of the bottom chassis.

Exemplary embodiments of a portable display device include a liquid crystal display panel for displaying an image, a back light assembly having a light source for supplying light to the liquid crystal display panel, and a bottom chassis supporting the back light assembly, the bottom chassis having a bottom chassis plate and one or more side walls protruding from the bottom chassis plate, the side walls having an I-beam or C-beam shaped cross-section.

The portable display device further includes a second printed circuit board connected to an external driving circuit, a first printed circuit board connected to the second printed circuit board to control the liquid crystal display panel and the light source, and a light emitting display panel connected to the second printed circuit board under the second printed circuit board to display an image.

The light emitting display panel includes a pair of substrates and organic light emitting diodes are arranged on the lower substrate in a matrix. The light emitting display panel and the second printed circuit board are connected to each other by a predetermined pad unit of a flexible printed circuit board.

The back light assembly includes light emitting diodes as a light source, a light emitting diode substrate, a light guide plate, a reflecting plate, optical sheets, and a mold frame for supporting and fixing the light emitting diode substrate on which the light emitting diodes are mounted.

An aperture is formed in a part of the center of the bottom chassis plate so that the light emitting display panel is insertable into the bottom chassis.

The liquid crystal display panel includes a first substrate, a second substrate that faces the first substrate and on which a plurality of thin film transistors are formed, and liquid crystal implanted between the first substrate and the second substrate.

DETAILED DESCRIPTION

Figure 1:
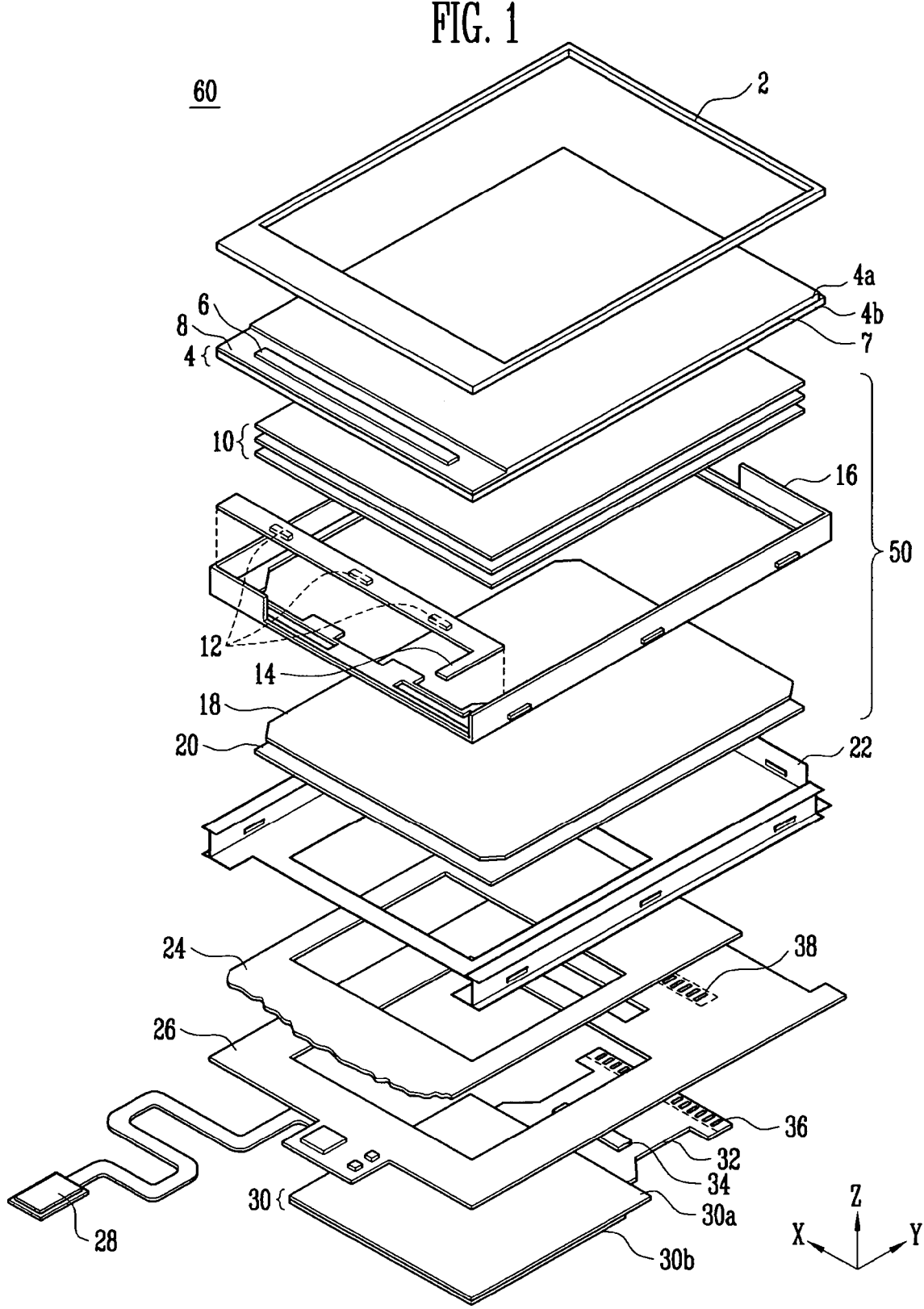
FIG. 1 is an exploded perspective view illustrating a portable display device according to an exemplary embodiment of the present invention.

Referring to FIG. 1, an exemplary embodiment depicts a dual type portable display device 60 used for a mobile telephone, as an example However, the present invention is not limited to the above exemplary embodiment. The portable display device 60 includes a top chassis 2, a liquid crystal display panel 4, a back light assembly 50, a bottom chassis 22, a first printed circuit board 24, a second printed circuit board 26, and a light emitting display panel 30.

The liquid crystal display panel 4 displays a predetermined image and includes a first substrate 4a, a second substrate 4b, and liquid crystal 7 implanted between the first substrate 4a and the second substrate 4b.

The second substrate 4b includes a plurality of transistors, such as thin film transistors (TFT), arranged in a matrix. Here, the source electrodes of the TFTs are connected to data lines and the gate electrodes of the TFTs are connected to scan lines. The drain electrodes of the TFTs are connected to pixel electrodes made of conductive and transparent indium tin oxide (ITO). The TFTs are turned on when scan signals are supplied to the scan lines to supply data signals supplied from the data lines to the pixel electrodes.

An integrated circuit 6 from which the data signals and the scan signals are supplied is inserted into one side of the second substrate 4b. A protective layer 8 is formed around the integrated circuit 6.

The first substrate 4a is arranged to face the second substrate 4b. Common electrodes made of ITO are formed on the front surface of the first substrate 4a. A predetermined voltage is applied to the common electrodes so that a predetermined electric field is formed between the common electrodes and the pixel electrodes. The arrangement angle of the liquid crystal implanted between the first substrate 4a and the second substrate 4b is changed by the electric field and light transmittance is changed by the changed arrangement angle so that it is possible to display a desired image.

The back light assembly 50 includes a mold frame 16, light emitting diodes 12, a light emitting diode substrate 14, a light guide plate 18, a reflecting plate 20, and optical sheets 10.

The light emitting diodes 12 generate light of a predetermined brightness in response to driving signals from the light emitting diode substrate 14.

The light guide plate 18 supplies the light supplied from the light emitting diodes 12 to the liquid crystal display panel 4. That is, the light guide plate 18 supplies the light supplied from the sides thereof to the liquid crystal display panel 4 positioned thereon.

The reflecting plate 20 is positioned on the rear surface of the light guide plate 18 to re-supply the light incident from the light guide plate 18 to the light guide plate 18. That is, the reflecting plate 20 re-supplies the light incident thereon to the light guide plate 18 to improve optical efficiency.

The first optical sheets 10 improve the brightness of the light supplied from the light guide plate 18 to supply the light to the liquid crystal display panel 4.

The light emitting diode substrate 14 is connected to the first printed circuit board 24 to supply the driving signals to the light emitting diodes 12 in response to control signals supplied from the first printed circuit board 24.

The light emitting diode substrate 14 in which the light emitting diodes 12 are mounted is supported by and fixed to the mold frame 16. The liquid crystal display panel 4 and the back light assembly 50 are also supported by the mold frame 16. Here, the top chassis 2 positioned on the mold frame 16 is fixed to the mold frame 16 and the bottom chassis 22 positioned under the mold frame 16 is fixed to the mold frame 16. An aperture is formed in a part of the bottom chassis 22 so that the light emitting display panel 30 is insertable into the bottom chassis 22.

The bottom chassis 22, which can also be referred to as a bezel, has sides which have I-beam shaped cross-sections so that the strength of the bottom chassis 22 is improved and that the bottom chassis 22 is firmly fixed to the mold frame 16. As a result, it is possible to realize a strong portable display device.

The second printed circuit board 26 receives the driving signals from a driving circuit of a mobile telephone (not shown). The second printed circuit board 26 includes a mobile telephone connector 28. The mobile telephone connector 28 is fixed to another connector attached to the driving circuit of the mobile telephone to receive the driving signals from the driving circuit of the mobile telephone. The second printed circuit board 26 that receives the driving signals generates various control signals in response to the driving signals supplied thereto.

The first printed circuit board 24 is connected to the second printed circuit board 26 through a first pad unit 38 formed in the second printed circuit board 26. The first printed circuit board 24 is connected to the integrated circuit 6 and the light emitting diode substrate 14 of the first liquid crystal display panel 4 by a flexible printed circuit board (not shown). The first printed circuit board 24 connected to the integrated circuit 6 and the light emitting diode substrate 14 drives the integrated circuit 6 and the light emitting diode substrate 14 in respond to the control signals supplied from the second printed circuit board 26.

The light emitting display panel 30 includes a first substrate 30a and a second substrate 30b. Organic light emitting diodes (not shown) are arranged on the first substrate 30a in a matrix. The organic light emitting diodes generate light of predetermined brightness in response to the amount of current supplied thereto. The light emitting display panel 30 is connected to the second printed circuit board 26 by the second pad unit 36 of a flexible printed circuit board 32. Here, an integrated circuit 34 is mounted on the flexible printed circuit board 32. The integrated circuit 34 lets the light emitting display panel 30 display a predetermined image in response to the control signals supplied from the second printed circuit board 26.

Figure 2A:
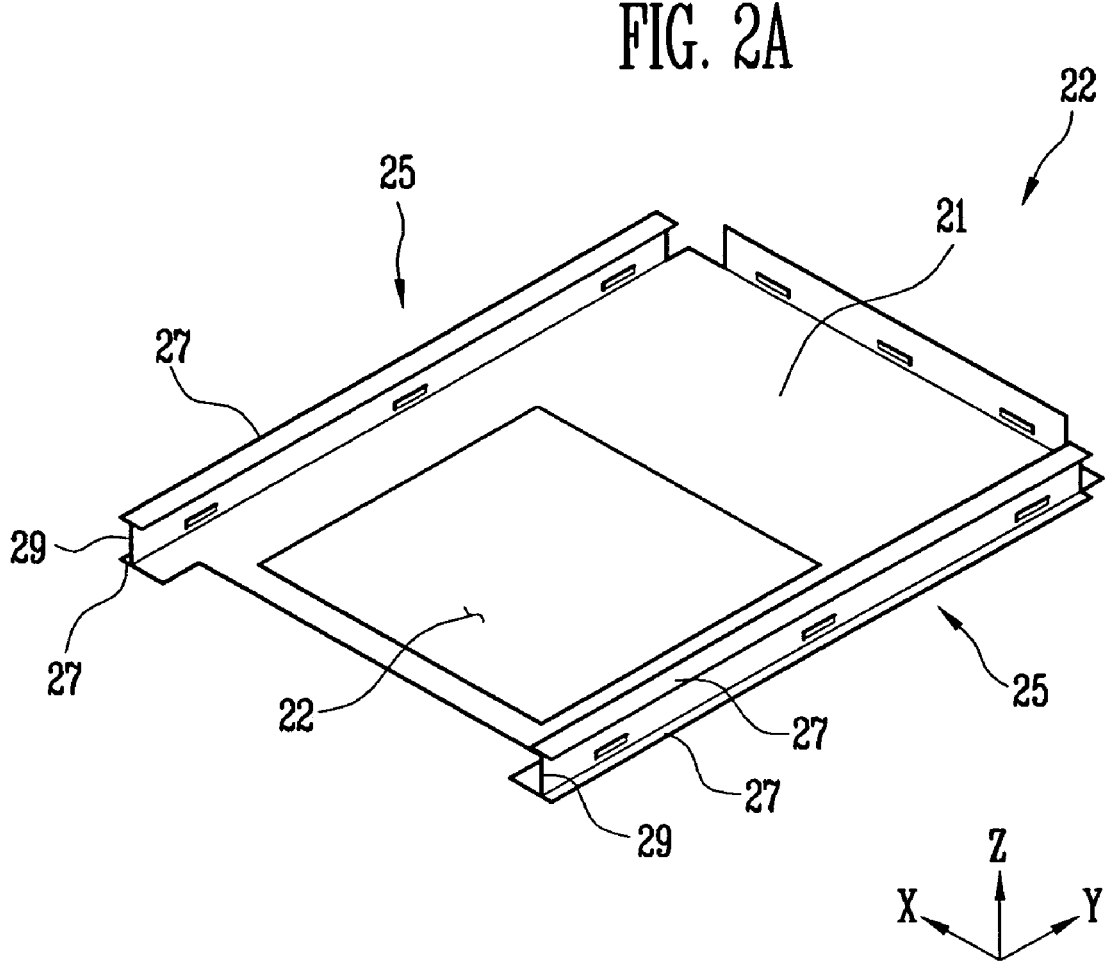
FIGS. 2A and 2B are respective perspective and cross-section views illustrating an exemplary embodiment of the bottom chassis shown in FIG. 1.

Referring now to FIG. 2A and FIG. 1, the bottom chassis 22 included in the portable display device according to an embodiment of the present invention is combined with the lower part of the mold frame 16 to fix the back light assembly and the liquid crystal display panel together with the top chassis 2 combined with the upper part of the mold frame.

Since the portable display device according to the embodiment of the present invention is dual type, an aperture 23 is formed in a part of the center bottom chassis plate 21 of the bottom chassis 22 so that the light emitting display panel 30 of FIG. 1 is insertable into the bottom chassis 22.

Figure 2B:
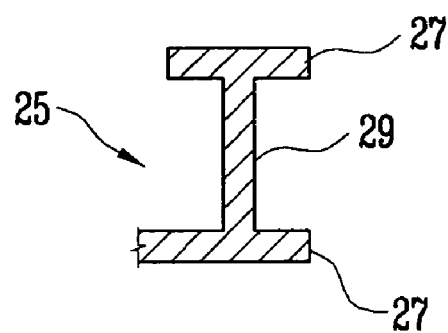

According to the present invention, as seen in FIG. 2B, the sides 25 of the bottom chassis 22 have an I-beam shaped cross-section, which includes a web 29 and flanges 27 so that the strength of the bottom chassis 22 is improved and that the bottom chassis 22 can be firmly combined with the mold frame 16. As a result, it is possible to realize a relatively strong portable display device.

The bottom chassis 22 illustrated in FIG. 2A is characterized in that the sides of the bottom chassis connected to the plate and have an I-beam shaped cross-section so that the flange portions 27 protrude about the web portions 29.

According to the above-described I-beam structure, the section modulus with respect to the X axis is much larger than the section modulus with respect to the Y axis, which is for more strongly supporting force in a direction than complex external force. That is, the I-beam structure has the largest section modulus with the same area.

Therefore, the sides of the bottom chassis 22 are I-beam shaped as illustrated in FIG. 2B so that the strength of the bottom chassis 22 is improved and that the bottom chassis 22 is firmly combined with the mold frame 16. As a result, it is possible to realize a strong portable display device.

In the case where the sides of the bottom chassis 22 are I-beam shaped so that the flanges of the sides protrude in both directions, only the protruding parts of the sides of the bottom chassis are exposed to the outside when the portable display device is formed.

Figure 3:
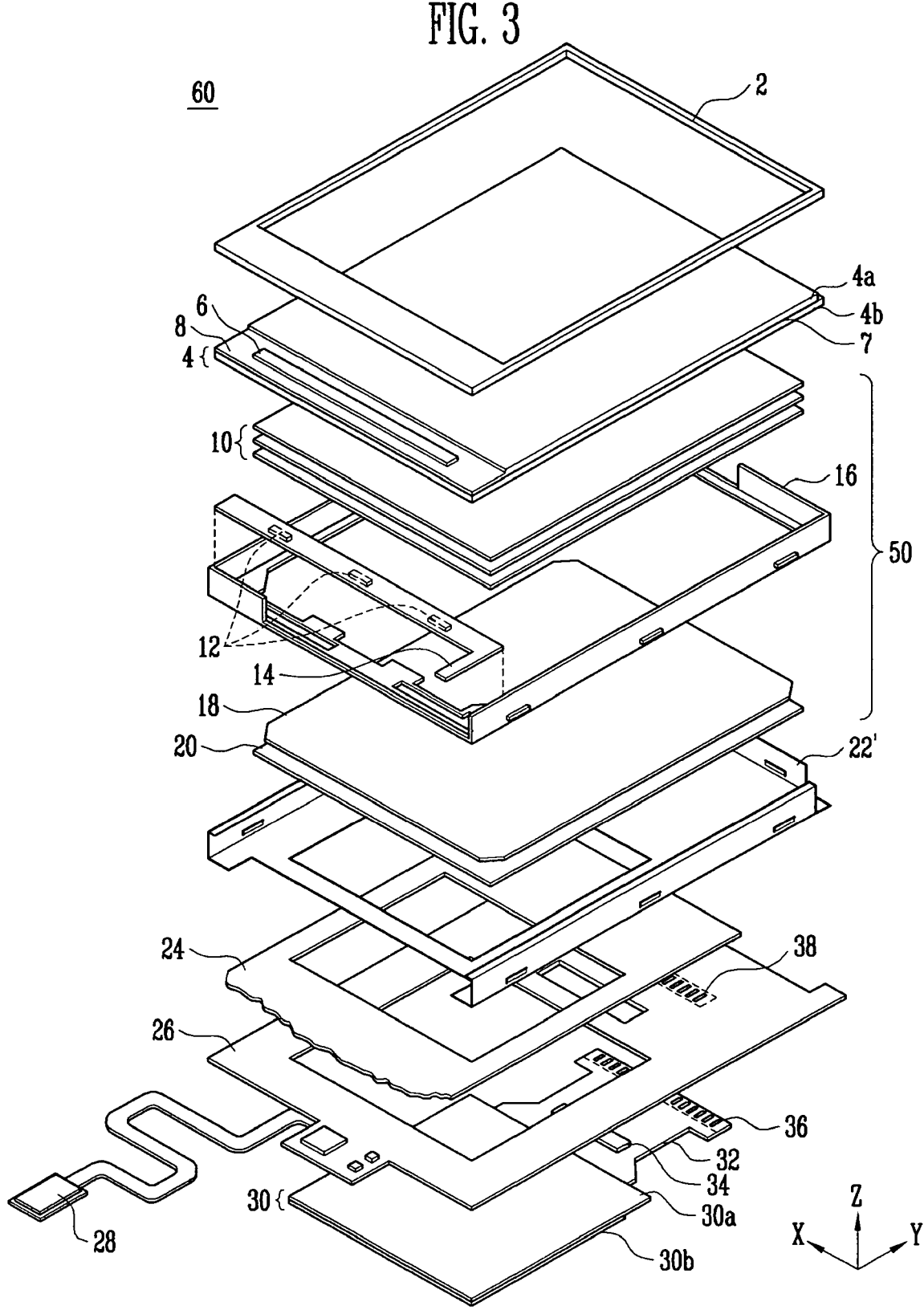
FIG. 3 is an exploded perspective view illustrating a portable display device according to another exemplary embodiment of the present invention.
Figure 4A:
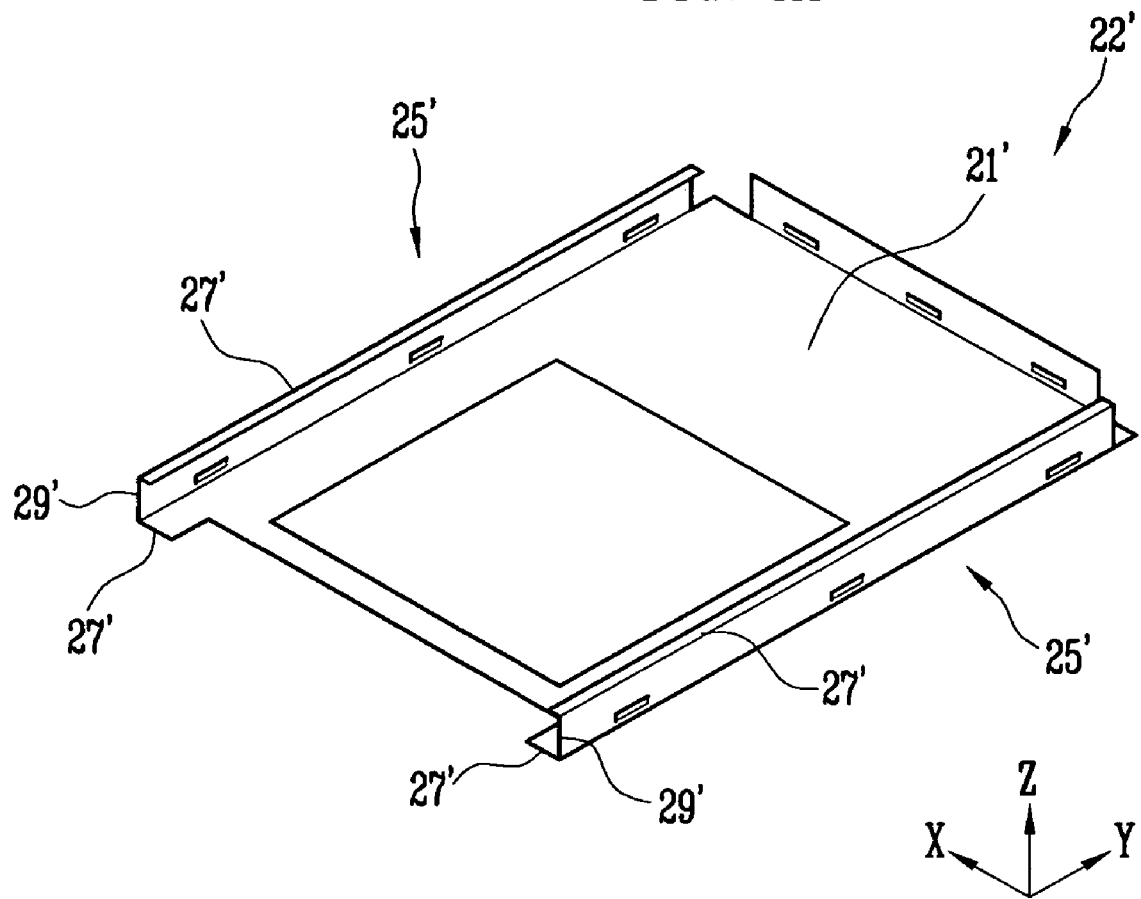
FIGS. 4A and 4B are respective perspective and cross-section views illustrating an exemplary embodiment of the bottom chassis shown in FIG. 3.
Figure 4B:
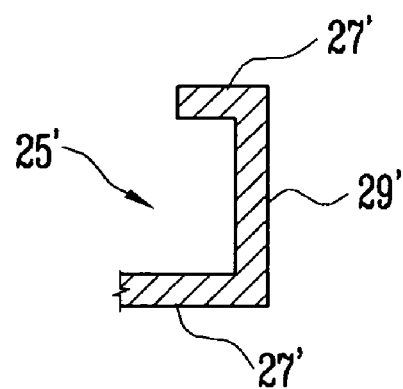

Referring now to FIGS. 3, 4A and 4B, another exemplary embodiment is depicted. FIG. 3 shows an exploded perspective view illustrating a portable display device with components similar to that of FIG. 1 as previously described, but with bottom chassis 22' in place of bottom chassis 22. The bottom chassis 22' is illustrated in FIGS. 4A and 4B. Unlike in the bottom chassis illustrated in FIGS. 2A and 2B, the sides 25' protruding from bottom chassis plate 21' of the bottom chassis 22' are not I-shaped but are C-shaped, having a web 29' and flanges 27', so that it is possible to prevent the protruding flanges 27' of the sides of the bottom chassis from being exposed to the outside when the portable display device is formed. In this embodiment, it is also possible to improve the strength of the bottom chassis 22'.

As described above, according to the present invention, the sides of the bottom chassis included in the portable display device are C-shaped so that it is possible to improve the strength of the bottom chassis. An aperture 23' is also provided to allow a light emitting display panel to be insertable into the bottom chassis 22'. As a result, it is possible to realize a strong portable display device.

Although exemplary embodiments of the present invention have been shown and described, it would be appreciated by those skilled in the art that changes might be made in the embodiments without departing from the principles and spirit of the invention, the scope of which is defined in the claims and their equivalents.

What is claimed is:

1. A portable display device comprising:
   a liquid crystal display panel for displaying an image;
   a backlight assembly comprising a light source for supplying light to the liquid crystal display panel and a frame for supporting and fixing the light source;
   a top chassis fixed to the frame, wherein the liquid crystal display panel is between the top chassis and the frame; and
   a bottom chassis fixed to the frame and for supporting the backlight assembly, the bottom chassis comprising a bottom chassis plate and one or more side walls protruding from the bottom chassis plate,
   wherein the one or more side walls have I-beam shaped cross-sections through substantially their respective lengths.

2. The portable display device as claimed in claim 1, further comprising:
   a second printed circuit board;
   a first printed circuit board connected to the second printed circuit board for controlling the liquid crystal display panel and the light source; and
   a light emitting display panel connected to the second printed circuit board under the second printed circuit board for displaying an image.

3. The portable display device as claimed in claim 2,
   wherein the light emitting display panel comprises a pair of substrates, and
   wherein organic light emitting diodes are on one of the pair of substrates in a matrix.

4. The portable display device as claimed in claim 2, wherein the light emitting display panel and the second printed circuit board are connected to each other by a pad of a flexible printed circuit board.

5. The portable display device as claimed in claim 1, wherein the backlight assembly further comprises:
   a light guide plate and reflecting plate between the frame and the bottom chassis; and
   optical sheets between the liquid crystal display panel and the frame, and
   wherein the light source comprises light emitting diodes on a light emitting diode substrate.

6. The portable display device as claimed in claim 1, wherein the bottom chassis plate includes an aperture such that the light emitting display panel is insertable into the bottom chassis.

7. The portable display device as claimed in claim 1, wherein the liquid crystal display panel comprises:
   a first substrate;
   a second substrate facing the first substrate and comprising a plurality of thin film transistors; and
   liquid crystal between the first substrate and the second substrate.

8. A portable display device comprising:
   a liquid crystal display panel for displaying an image;
   a backlight assembly comprising a light source for supplying light to the liquid crystal display panel; and
   a bottom chassis supporting the backlight assembly, the bottom chassis having a bottom chassis plate and one or more side walls protruding from the bottom chassis plate,
   wherein the one or more side walls have C-shaped cross-sections through substantially their respective lengths.

9. The portable display device as claimed in claim 8, further comprising:
   a second printed circuit board;
   a first printed circuit board connected to the second printed circuit board for controlling the liquid crystal display panel and the light source; and
   a light emitting display panel connected to the second printed circuit board under the second printed circuit board for displaying an image.

10. The portable display device as claimed in claim 9,
    wherein the light emitting display panel comprises a pair of substrates, and
    wherein organic light emitting diodes are on one of the pair of substrates in a matrix.

11. The portable display device as claimed in claim 9, wherein the light emitting display panel and the second printed circuit board are connected to each other by a pad of a flexible printed circuit board.

12. The portable display device as claimed in claim 8, wherein the backlight assembly further comprises:
    a mold frame for supporting and fixing a light emitting diode substrate;
    a light guide plate and reflecting plate between the mold frame and the bottom chassis; and
    optical sheets between the liquid crystal display panel and the mold frame, and
    wherein the light source comprises light emitting diodes on the light emitting diode substrate.

13. The portable display device as claimed in claim 8, wherein the bottom chassis plate includes an aperture such that the light emitting display panel is insertable into the bottom chassis.

14. The portable display device as claimed in claim 8, wherein the liquid crystal display panel comprises:
    a first substrate;
    a second substrate facing the first substrate and comprising a plurality of thin film transistors; and
    liquid crystal between the first substrate and the second substrate.

* * * * *